United States Patent [19]

Uyeda

[11] 4,090,303
[45] May 23, 1978

[54] KEY DECODING APPARATUS

[75] Inventor: Tim M. Uyeda, South San Gabriel, Calif.

[73] Assignee: La Gard, Inc., Torrance, Calif.

[21] Appl. No.: 679,169

[22] Filed: Apr. 22, 1976

Related U.S. Application Data

[62] Division of Ser. No. 582,639, Jun. 2, 1975, Pat. No. 4,012,991.

[51] Int. Cl.² ............................ G01B 3/28; G01B 5/20
[52] U.S. Cl. ................................. 33/174 F; 33/172 E; 90/13.05
[58] Field of Search ...................... 33/174 F, 172 E; 90/13.05

[56] References Cited

U.S. PATENT DOCUMENTS

| | | | |
|---|---|---|---|
| 2,066,645 | 1/1937 | Rial | 33/174 F |
| 2,727,312 | 12/1955 | Tampke | 33/174 F |
| 3,482,323 | 12/1969 | Hamel et al. | 33/172 E |

*Primary Examiner*—Z. R. Bilinsky
*Attorney, Agent, or Firm*—Poms, Smith, Lande & Glenny

[57] ABSTRACT

Method and apparatus for decoding and duplicating a key wherein the notches in the shank of the key are coded to a predetermined coded depth and spacing therebetween. An index card having a sequential index thereon corresponding to the predetermined coded depth is inserted into a housing and the key to be duplicated is inserted into a slot in the housing where it engages an indexing member which enters one of the notches on the key and indicates on the card the coded depth of that notch. The angle of cut of the same notch may also be determined. The remaining notches of the key may be decoded in like manner. The same index card is then inserted into a housing which includes an indexing drum having notches therein with spacing therebetween corresponding to the predetermined coded spacing of the key to be duplicated. A blank key is firmly secured in a predetermined position on the housing and movable in a direction toward a grinding wheel. The indexing drum is indexed corresponding to the predetermined coded spacing between the notches of the key to be duplicated and the blank key is moved into cutting engagement with the grinding wheel. The depth of the cut made by the grinding wheel on the blank key is indicated on the card by a pointer pivotally secured in the housing and the spacing between the notches is determined by the drum operatively engaging an index pin which conformably fits into selected spaced notches on the drum. The pointer is moved across the sequential index on the card to indicate the depth of cut. The same angle of cut of the notches in the key being duplicated may also be cut in the blank key. When duplicating a key that is already a duplicate of a preceding duplicate or original key wherein deviations from the original coded depth may be present, the original coded depth of the key it is desired to duplicate may be determined before duplicating a key therefrom so that the duplicated key is more accurate than the key from which the duplicate was made.

5 Claims, 22 Drawing Figures

KEY DECODING APPARATUS

This is a division, of application Ser. No. 582,639, filed June 2, 1975 now U.S. Pat. No. 4,012,991.

BACKGROUND OF THE INVENTION

1. Field of the Invention

The invention relates to the duplication of keys; and, more particularly, to key decoding and duplicating means.

2. Description of the Prior Art

It is well known in the key art that keys of one type of manufacture are coded in a predetermined manner. That is, such keys of the type having a plurality of spaced notches of varying depths and spacing therebetween are coded to a predetermined coded depth and spacing therebetween by the manufacturer thereof. This information is generally available to those in the key duplicating trade. In certain instances, such keys have indicia thereon indicating the code of the key. However, it is not desirable to have such information on keys for security reasons or the like. In addition, the notches cut into such keys have differing angles of cut. There is thus a need for means for quickly and easily decoding such keys and determining the angle of cut so that duplicates may be made therefrom.

Another problem is that the key it is desired to duplicate may already be a duplicate key. That is, it may be a duplicate of an original key, a duplicate of a preceding duplicate key, etc.. During previous duplications, tolerances added during the duplicating process may have introduced deviations into the duplicated key whereby it does not exactly fit into the lock for which the key was made. There is thus a need for means that gives a quick and easily approximation of the original coded depth and spacing of the key being duplicated so that, when the key is duplicated, it may be duplicated in a manner more closely approximating the original key.

Finally, once such a key is decoded, there is a need for using such information to duplicate the decoded key on a blank key. Such duplicate key must be cut in a manner whereby the notches cut therein are spaced and of a depth corresponding to the predetermined coded depth and spacing of the original key.

The same angle of cut as in the key being duplicated must be made on the blank key. There is therefore a need for a method and apparatus for quickly and easily duplicating a key once that key is decoded.

SUMMARY OF THE INVENTION

It is an object of this invention to provide method and apparatus for decoding a key having notches thereon of a predetermined coded depth and spacing.

It is a further object of this invention to decode a duplicate key which may have variations built into the duplicate key from the original predetermined coded depth and spacing of the notches therein.

It is still another object of this invention for providing a method and apparatus for duplicating a key once it is decoded in a manner duplicating the original coded spacing and depth of the notches in the key being duplicated.

It is still further an object of this invention to provide a method for decoding a key and duplicating the decoded key.

It is still another object of this invention to determine the angle of cut of the key being duplicated and cut the duplicate key in the same manner.

These and other objects are preferably accomplished by providing an index card having a sequential index thereon corresponding to the predetermined coded depth of the key desired to be duplicated. This card is inserted into a housing and the key to be duplicated is inserted into a slot in the housing where it engages an indexing member which enters one of the notches on the key and indicates on the card and coded depth of that notch. The angle of cut of the same notch may also be determined. The remaining notches of the key may be decoded in like manner. The same index card is then inserted into a housing which includes an indexing drum having notches therein with spacing therebetween corresponding to the predetermined coded spacing of the key to be duplicated. A blank key is firmly secured in a predetermined position on the housing and movable in a direction toward a grinding wheel. The indexing drum is indexed corresponding to the predetermined coded spacing between the notches of the key to be duplicated and the blank key is moved into cutting engagement with the grinding wheel. The depth of the cut made by the grinding wheel on the blank key is indicated on the card by a pointer pivotally secured in the housing and the spacing between the notches is determined by the drum operatively engaging an index pin which conformably fits into selected spaced notches on the drum. The pointer is moved across the sequential index on the card to indicate the depth of cut. The same angle of cut of the notches in the key having the notched shank may also be cut in the blank key. When duplicating a key that is already a duplicate of a preceding duplicate or original key wherein deviations from the original coded depth may be present, the original coded depth of the key it is desired to duplicate may be determined before duplicating a key therefrom so that the duplicated key is more accurate than the key from which the duplicate was made.

DESCRIPTION OF THE PREFERRED EMBODIMENT

Referring now to the drawings, FIGS. 1 through 22 disclose apparatus for carrying out the method of the invention wherein a key may be decoded and a duplicate key made from the decoded information. FIGS. 1 through 8 disclose apparatus for carrying out the apparatus and method for decoding a key. FIGS. 9 through 22 disclose apparatus for carrying out the apparatus and method for duplicating a decoded key. A portion of the apparatus of FIGS. 1 through 8, shown in detail in FIG. 8 also forms a part of the apparatus of FIGS. 9 through 21.

Thus, referring more particularly to FIGS. 1 through 4, as particularly contemplated in the present invention, decoding means 10 is shown for decoding a key from which a duplicate is desired to be made. As will be discussed, the key to be duplicated is a standard key having a head and a shank having a plurality of spaced notches therealong. Such notches may extend along only one or both sides of the shank and the techniques of my invention are applicable to both types. Further, the key to be decoded is of a particular type or of a certain manufacturer who provides keys having notches of predetermined coded spacing and depths. Thus, either the coded key-type is known beforehand or the manufacturer thereof. These coded depths have no relation to any actual measurements; i.e., the coded depth alone does not indicate the actual depth.

Such information is generally available to those in the key duplicating art. Accordingly, decoding means 10 includes coded indicia bearing means 30 in the form of a plurality of index cards, such as the card shown in FIG. 8, which card may have coded information recorded thereon relating to one or more coded key-types. This will be explained more in detail hereinbelow.

Also, as particularly contemplated in the present invention, decoding means 10 includes housing means 11 for receiving the indicia bearing means 30 and the key to be decoded; key receiving means 15 in the housing for receiving the notched shank portion of the key to be decoded therein; and coded notch depth indicating means 40 for indicating the coded depth of the notches in the key being decoded.

Figure 3:
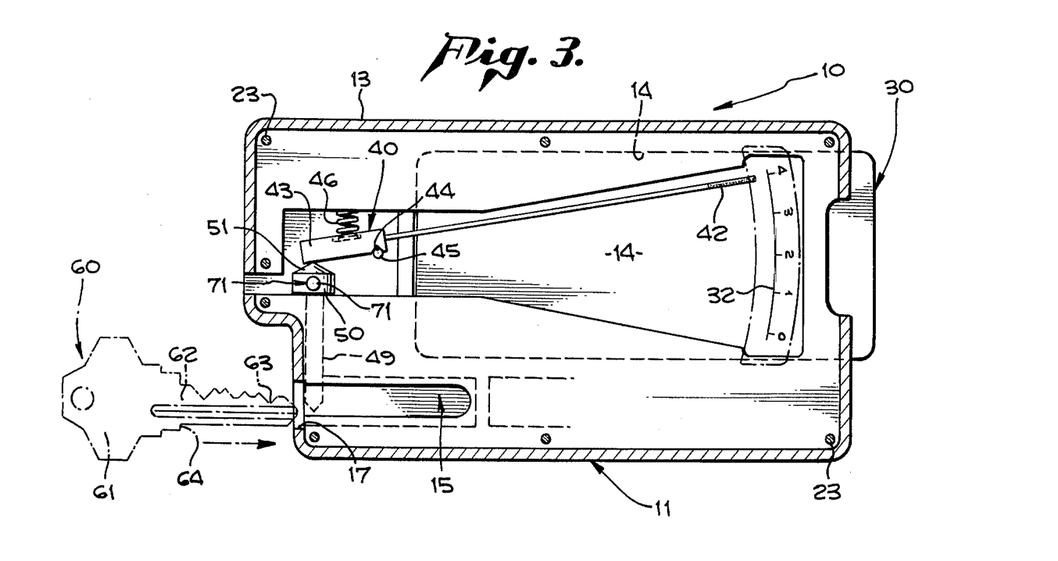
FIG. 3 is a view taken along lines III—III of FIG. 2.

In addition, it is well known that the notches that are cut in the shanks of keys such as that illustrated in FIG. 3 are cut at various angles. Thus, as particularly contemplated in the present invention, decoding means 10 further includes angle-of-cut indicating means 70 for indicating the angle of cut in the notch being decoded.

FIGS. 9 through 22, as heretofore discussed, as particularly contemplated in the present invention, illustrate duplicating means 80 for duplicating a key decoded as will be discussed with respect to FIGS. 1 through 8. In addition to the aforementioned coded indicia bearing means 30, duplicating means 80 includes housing means 81 for receiving the indicia bearing means 30 therein; blank key holding and positioning means 150 for positioning and holding a blank key in a predetermined position prior to cutting notches therein; notch cutting means 160 for cutting notches in the blank key; key moving means 140 for moving the blank key into cutting engagement with the cutting means 160; and indexing means 100 for indexing the predetermined coded spacing between the notches being cut in the blank key. Further, the duplicating means 80 may also include angle-of-cut indexing means 170 to index the predetermined angle of cut of the notches to be made on the blank key.

Figure 1:
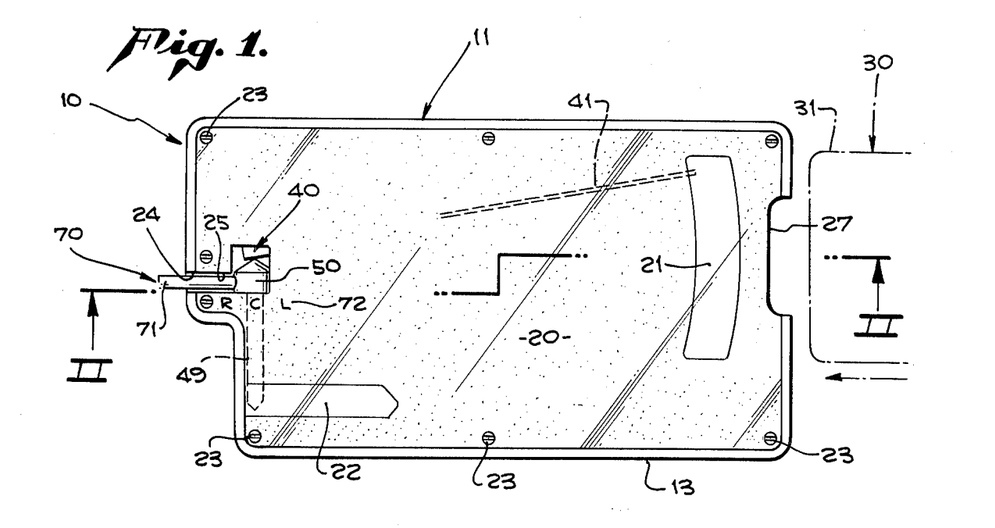
FIG. 1 is a top plan view of decoding means for carrying out the apparatus and method of the invention.
Figure 4:
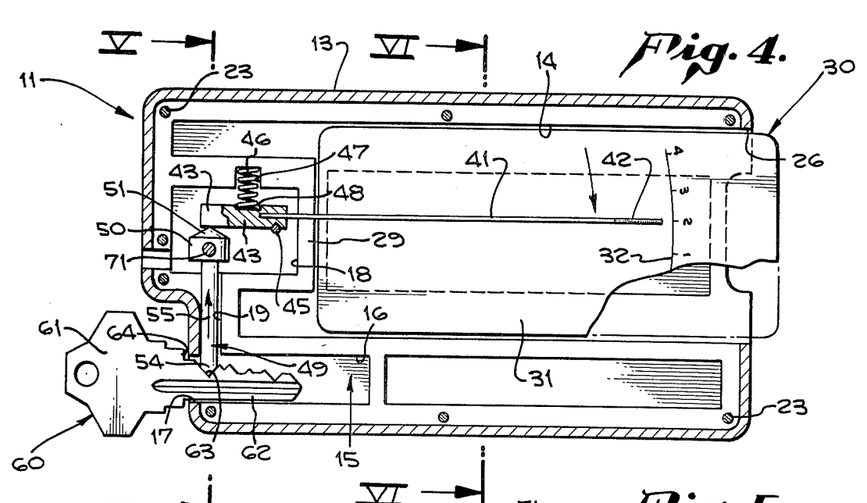
FIG. 4 is a view taken along lines IV—IV of FIG. 2.

Accordingly, referring once again to FIGS. 1 through 4, decoding means 10, in the exemplary embodiment of the invention, includes housing means 11 which may be formed of one or more sections and of any suitable material, such as plastic, cast aluminum, etc. Thus, housing means 11 includes a base 12 (see FIG. 2) and a peripheral side wall 13. The base 12 may be formed from a solid piece having hollowed-out portions to form an inner cavity 14 (see particularly FIG. 6) of a width suitable to receive the indicia bearing means 30 therein, and, as shown in FIG. 4, to form key receiving means 15 in the form of a slot 16 communicating with an opening 17 in the peripheral wall 13. A cavity 18 smaller than cavity 14 is also formed on base 12 (see FIG. 4) and, as will be discussed, communicates with slot 15 through a slot 19. A gnerally opaque cover 20 closes off the entire base 12 and wall 13 to form a compact, easily and economically manufactured unitary structure. For reasons to be discussed, cover 20 may include clear or transparent windows 21 and 22 and be secured to wall 13 or sections of base 12 by suitable screws 23 or the like. In addition to opening 17 in wall 13, a small opening 24 is formed in wall 13 (see FIG. 1) and communicates with an L-shaped opening 25 in cover 20 for reasons to be discussed. An opening 26 (see FIGS. 2 and 4) wide enough to receive indicia bearing means 30, as will be discussed, therein is also formed a wall 13 communicating with cavity 14. As shown in FIGS. 1 and 3, cover 20 may be partly relieved as at portion 27 above opening 26 to assist in inserting the indicia bearing means 30.

As discussed, decoding means 10 includes indicia bearing means 30 in the form of an index card 31 (see FIG. 8) which includes indicia thereon relating to the coded notch depths of various key-types. For example, the legends A through D may indicate four differing types of keys. Each arcuate lines 32 through 35 indicates a sequented index of that particular key-type. For example, Row A indicates a key that is coded from zero to four, this indicating the known coded depths of the notches on keys offered by the "A" manufacturer. Such indicia may progress from the left to right or right to left depending on the manufacturer. Thus, each index card 31 may have one or more coded depths recorded thereon. Also, as shown in FIG. 2, slot 26 and cavity 14 may be wide enough and deep enough to receive a stack of cards 31, if desired.

Figure 8:
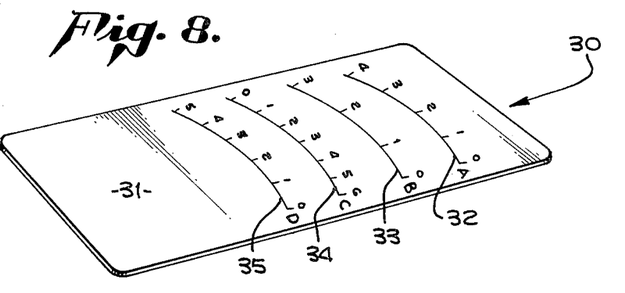
FIG. 8 is a perspective view of indicia bearing means in accordance with the invention.

As shown in FIG. 1, a card 31 is shown in phantom about to be inserted in slot 26 and into cavity 14. As shown in FIGS. 3 and 4, card 31 is inserted into cavity 14 until the desired row or line 32 is visible in window 21. It can be seen that Row A on card 31 in FIG. 8 is visible in window 21 in FIG. 3. If card 31 were pulled out to the right in FIG. 3, subsequent Rows B through D would then be visible. Thus, the coded information relating to the type of key to be decoded is placed in window 21.

Figure 2:
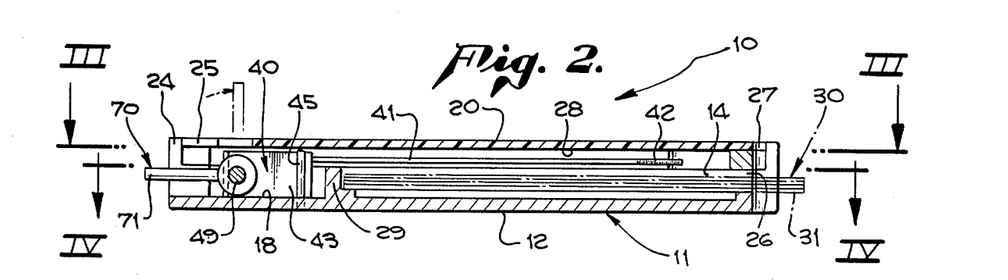
FIG. 2 is a view taken along lines II—II of FIG. 1.

It can be seen in FIG. 2 that a spacing is formed between the undersurface 28 of cover 20 and the top of the inner wall 29 forming cavity 14 of housing means 11. Cards 31 abut against wall 29 as shown in FIG. 2. However, decoding means 10, in the exemplary embodiment of the invention, includes coded notch depth indicating means 40. Means 40, as shown in FIG. 3, includes an elongated dial or pointer 41 which may be colored or the like at tip 42 and which is adapted to sweep across line 32. As can be seen in FIG. 2, pointer 41 moves across the spacing between cover 20 and wall 29. As shown in FIG. 3, the pointer 41 is fixedly secured to a block member 43 having a notch 44 pivotal about a pin 45 securely mounted in housing means 11 (see FIG. 2). A spring 46 is securely mounted at one end in a cavity 47 formed in a portion of inner wall 29 (see FIG. 4) and has its free end disposed in a cavity 48 in block member 43.

Indicating means 40 further includes a pin member 49 having a main head portion 50 which includes a tapered portion 51 adapted to abut against the underside 52 of block member 43 as shown in FIGS. 3 and 4. Pin member 49 further includes a downwardly extending portion 53 terminating in an end portion 54 which, as shown in FIGS. 3 and 4, is tapered so as to conformably fit into the notches in a key 60. As indicated by the arrow 55 in FIG. 4, pin member 49 is adapted to move up and down in slot 19 and retained therein by the walls forming slot 19.

Before discussing the remaining inventive features of the decoding means 10 of FIGS. 1 through 8, for purposes of description, key 60, as shown in FIGS. 3 and 4, will be described. It is to be understood that key 60 is of a standard type having an apertured head 61 and an integral shank 62. Shank 62 has a plurality of spaced notches 63 of varying depths and spacing therebetween. Key 60 also has a stop or shoulder 64 between the head 61 and shank 62. Although notches 63 are disposed only along one side of shank 62, obviously such notches may be disposed on both sides and the invention disclosed herein is applicable to both.

In operation, card 31 is inserted into housing means 11 as heretofore described. Key 60, which is to be decoded, is inserted through opening 17 into slot 15 (which slot and opening forms the key receiving means 15) until shoulder 64 abuts against the portions of side wall 13 forming slot 17 as shown in FIG. 4. During such insertion, pin member 49 is moved in the direction of arrow 55 in FIG. 4 and tapered portion 51 abutting block member 43 moves member 43 against spring 46 to thereby move indicator 41 which sweeps across line 32. The window 22 enables the user to view the key shank 63 in the slot 15. Also, as key 60 is inserted into the slot 16, the end portion 54 enters the first notch 63, (i.e., the notch 63 closest to head 61) in the shank 62 of key 60 as shown in FIG. 4. The tip 42 of pointer 41 indicates the position on line 32 related to the coded depth of that notch 63 (i.e., a No. 2 depth of the A type key) as shown in FIG. 4. This information may be recorded and the key 60 sequentially moved to the left in FIG. 4 to thereby decode the remaining notches 63 in like manner. The shank 62 of key 60 is of course visible through window 22.

Figure 5:
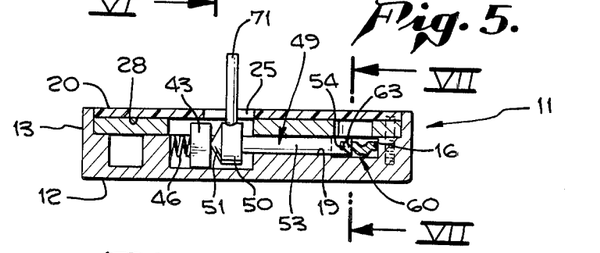
FIG. 5 is a view taken along lines V—V of FIG. 4.
Figure 6:
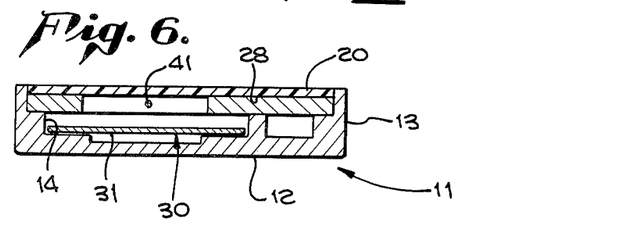
FIG. 6 is a view taken along lines VI—VI of FIG. 4.
Figure 7:
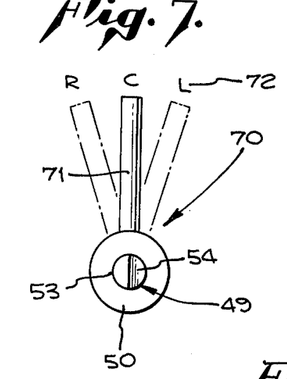
FIG. 7 is a view taken along lines VII—VII of FIG. 5 with parts thereof omitted for convenience of illustration.

As heretofore discussed, decoding means 10, as particularly contemplated in the present invention, includes angle of cut indicating means 70 for indicating the angle of cut of the notches 63 decoded in key 60 as discussed hereinabove. Thus, in the exemplary embodiment of the invention, such indicating means 70 includes an indicating member 71, such as a pin, fixedly secured to head portion 50 of pin member 49 as shown in particular in FIGS. 1 and 5. Member 71 is movable within the opening 25 and out of housing means 11 as shown in FIG. 5. Indicia 72, as shown in FIG. 1, may be provided on cover 20 (or on the inner wall 29 visible through cover 20) to indicate a right angle cut (R), a left angle cut (L) and a straight angle cut (C). This is clearly shown in FIG. 7. When end portion 54 conformably fits into each notch 63 in shank 62, the indicating member 72 will move within opening 25 to either one of these three positions, depending upon the angle of cut of each notch. If the notch has a normal or staight cut, member 71 will assume the central or C position. If the cut of the notch is to the right, it will assume the right or R position and, if to the left, it will assume the left or L position. Thus, the angle of the cut can be determined for each notch and recorded along with the coded depth of cut.

Referring now to FIGS. 9 through 22, duplicating means 80 are illustrated for duplicating a key that has been decoded as discussed hereinabove with respect to FIGS. 1 through 8. As particularly contemplated on the present invention, duplicating means 80 includes housing means 81 for housing the various components. In the exemplary embodiment of the invention, housing means 81 includes a base 82 (see FIG. 12) which may include an upper wall portion 83 and downwardly extending side walls 84 terminating in legs 85 thus forming an inner space 86.

Figure 9:
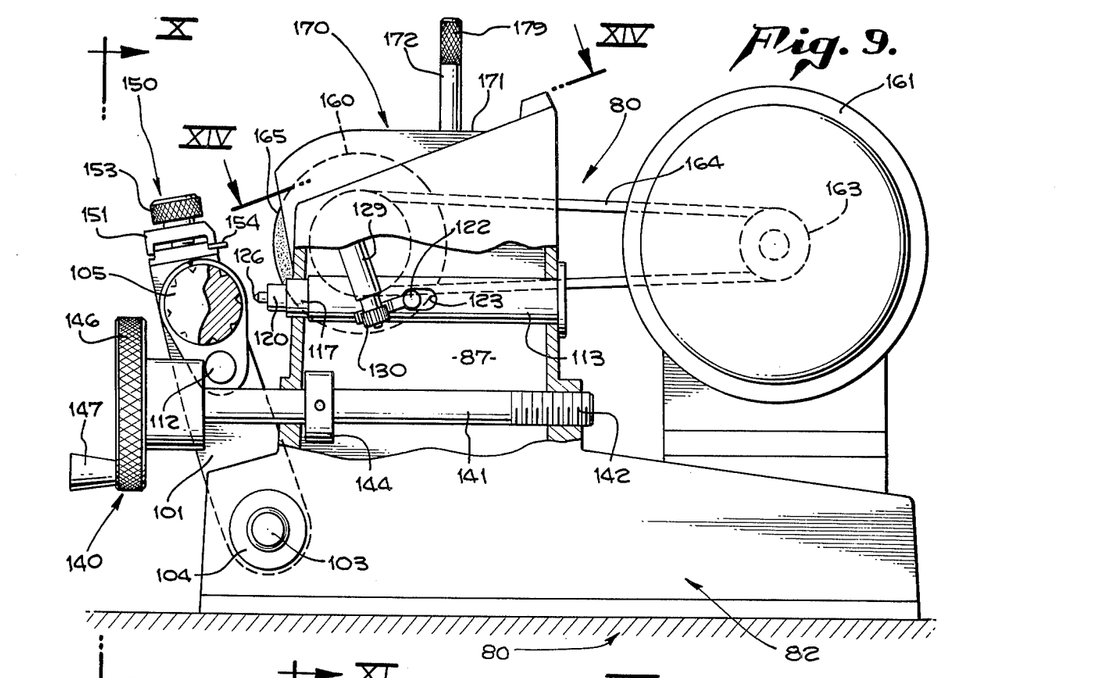
FIG. 9 is a vertical, partly sectional, view of duplicating apparatus for carrying out the apparatus and method of the invention.
Figure 10:
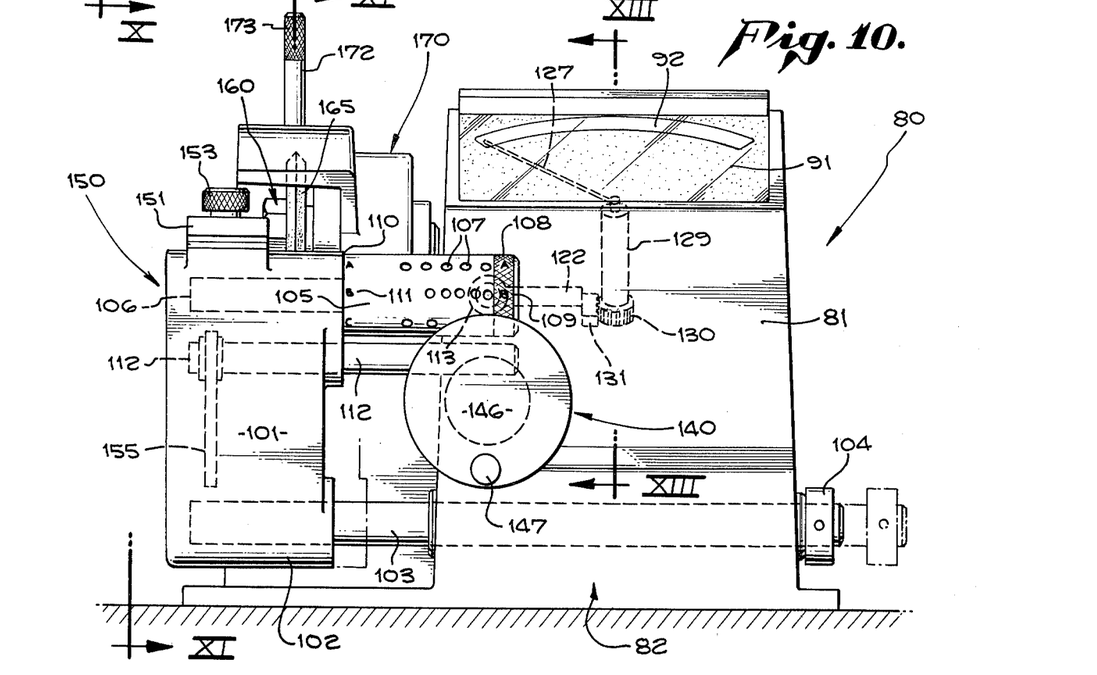
FIG. 10 is a view taken along lines X—X of FIG. 9.
Figure 12:
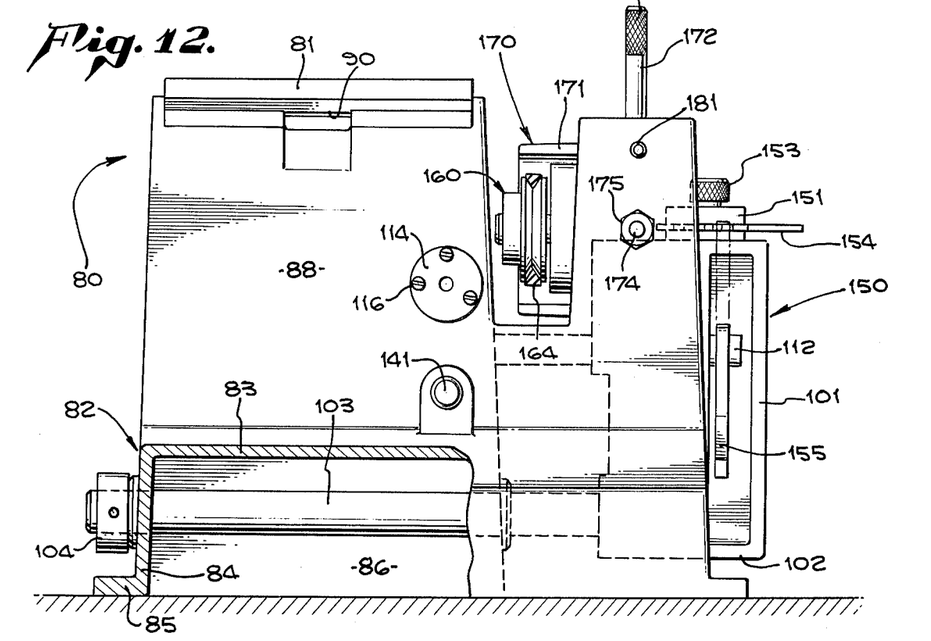
FIG. 12 is a view taken along lines XII—XII of FIG. 11.

Duplicating means 80 further includes indexing means 100 including a main body portion 101 (FIG. 9) having an apertured lower end 102 receiving a shaft 103 therethrough. As shown in FIGS. 10 and 12, shaft 103 extends across the space 86 of housing means 81 and out one side thereof and terminates in a stop member 104. Body portion 101 is pivotally mounted on shaft 103. An indexing drum 105 is rotatably mounted on a shaft 106 secured to main body portion 101 and includes a plurality of aligned rows of spaced notches 107 (see FIG. 10). A knurled knob 108 may be provided on drum 105 for ease in rotating drum 105. Indicia 109 (such as A, B & C) may be provided on knob 108 (or drum 105) corresponding to the rows (32 through 35) A through D of card 31 of FIG. 8 for reasons to be discussed. It is to be understood that all of the notches 107 in one aligned row are coded to the spacing of the type of key related to that particular row. That is, Row A in FIG. 8 relates to one predetermined coded depth of notches in one key type and the spacing between the notches 107 in Row A of FIG. 10 corresponds to the coded spacing between notches of the same key type. Further, indicia 110, such as an indicating arrow or the like, may be provided on main body portion 101 which corresponds with indicia 111 on indexing drum 105 (FIG. 10).

Indexing means 100 further includes a bar 112 fixedly mounted on main body portion 101. As can be seen in FIG. 10, bar 112 extends the full length of drum 105 and is spaced therefrom for reasons to be discussed.

Housing means 81 further includes a housing section 87 having a hollow interior and formed by upstanding side walls 88 and a top wall 89 (see particularly FIG. 13) integral with upper wall portion 83. Indexing means 100 further includes a fixed hollow sleeve member 113 mounted in side walls 88 fixed at one end in side wall 8 by a suitable flange member 114 having a sleeve portion 115 fitting into sleeve member 113 and secured to wall 88 by screws 116 or the like. The opposite end of sleeve member 113 extends through an opening 117 in side wall 88' and has a shoulder 118 abutting the walls surrounding opening 117. A pin member 119 extends through sleeve member 113 and sleeve portion 115 to prevent rotation thereof.

Figures 13, 22:
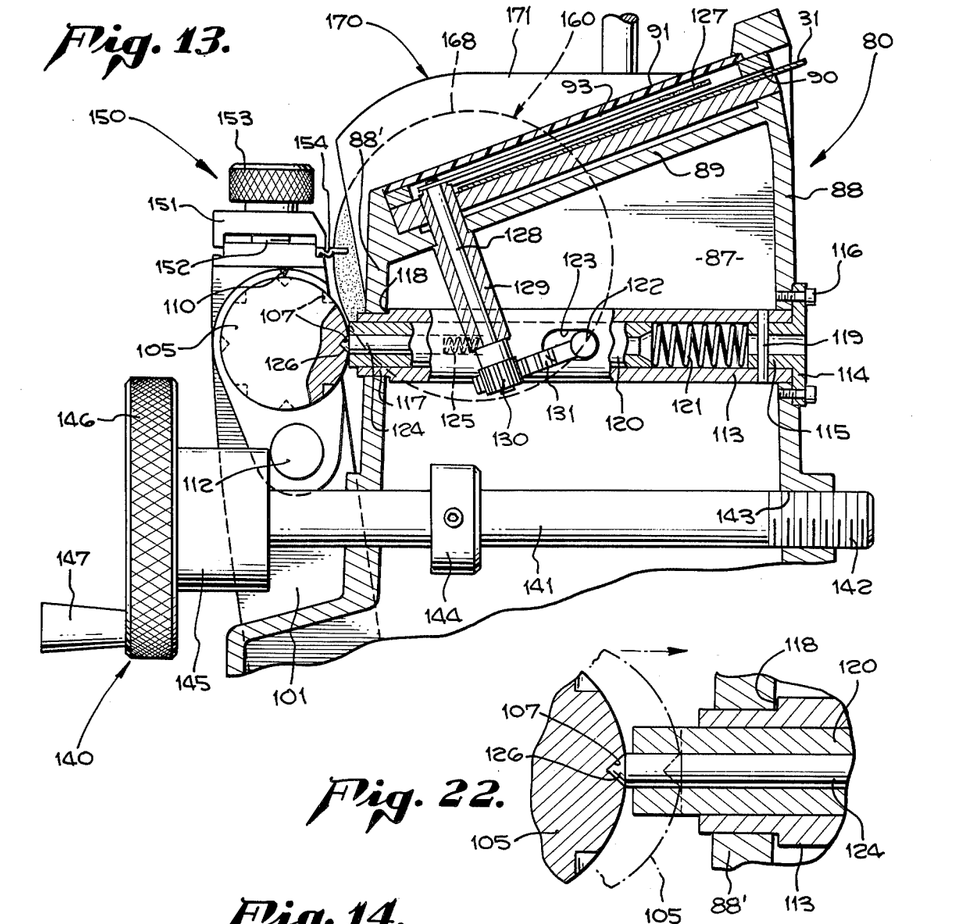
FIG. 13 is a view taken along lines XIII—XIII of FIG. 10.
FIG. 22 is a detailed view showing a detail of the indexing means for duplicating a key

A movable sleeve 120 is slidably mounted within sleeve member 113 and a spring 121 is disposed within sleeve member 113 and the sleeve portion 115 of flange member 114. A post 122 is fixed to sleeve 120 and extends out of sleeve member 113 through a slot 123. It can be seen in FIG. 13 that the slot 123 limits the movement of post 122. An indexing pin 124 is slidably mounted within sleeve 120 and is biased toward indexing drum 105 by a spring 125 within sleeve 120. Indexing pin 124 terminates in a tapered end portion 126 conforming to the notches 107 as shown in FIG. 13. Also, as shown in FIG. 22 and to be heretofore described, the drum 105 is adapted to be moved to a position whereby end portion 126 of pin 124 enters an aligned notch 107, with end portion 126 spaced from sleeve 120 and extending outwardly thereof as also shown in FIG. 9, then drum 105 is moved from the solid line position in FIG. 22 to its dotted line position whereby drum 105 abuts against sleeve 120 (this is the final position prior to cutting a blank key as will heretofore be described).

Figure 14:
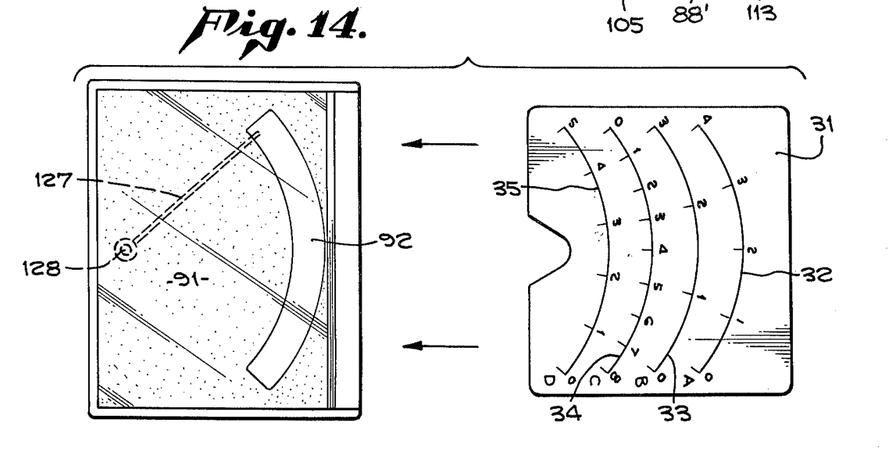
FIG. 14 is a view taken along lines XIV—XIV of FIG. 9 with portions thereof omitted for convenience of illustration and showing indicia bearing means about to be inserted into the apparatus of FIG. 9.

Housing means 81 further includes a slot 90 formed in the top wall 89 for receiving the coded indicia bearing index card 31 of FIG. 8 therein (see FIG. 14). An opaque cover 92, having a transparent window 92, closes off the top wall 89 (see also FIG. 14) and is spaced from slot 90 to form a space 93 therebetween.

Indexing means 100 further includes a pointer 127 movable within space 93 and fixedly secured at one end to a pivot shaft 128 rotatably mounted in a sleeve 129 fixedly secured at one end to wall 89. Shaft 128 extends out of sleeve 129 and terminates in a gear 130 (see FIGS. 10 and 13) which meshes with a gear rack 131 fixedly secured to post 122 (see particularly FIG. 13).

Duplicating means 80, as particularly contemplated in the present invention, includes key moving means 140 for moving a blank key into cutting engagement with the aforementioned notch cutting means.

In the exemplary embodiment, such key moving means 140, as particularly shown in FIG. 13, includes a shaft 141 threaded at one end 142 in a threaded aperture 143 in side wall 88 of housing means 81. A stop member 144 is fixedly secured to shaft 141 and adapted to abut against side wall 88' when shaft 141 is rotated. Shaft 141 extends past side wall 88' and terminates in an enlarged sleeve member 145 which abuts against bar 112 as seen in FIG. 13. A knurled knob 146 is fixedly secured to sleeve member 145 and may have a handle 147 thereon to assist in rotating shaft 141. As clearly shown in FIG. 13, rotation of shaft 141, via knob 146 and handle 147, moves sleeve member 145 against bar 112 which also moves drum 105 into engagement with indexing pin 124.

Figures 15, 16, 17, 18, 19, 20, 21:
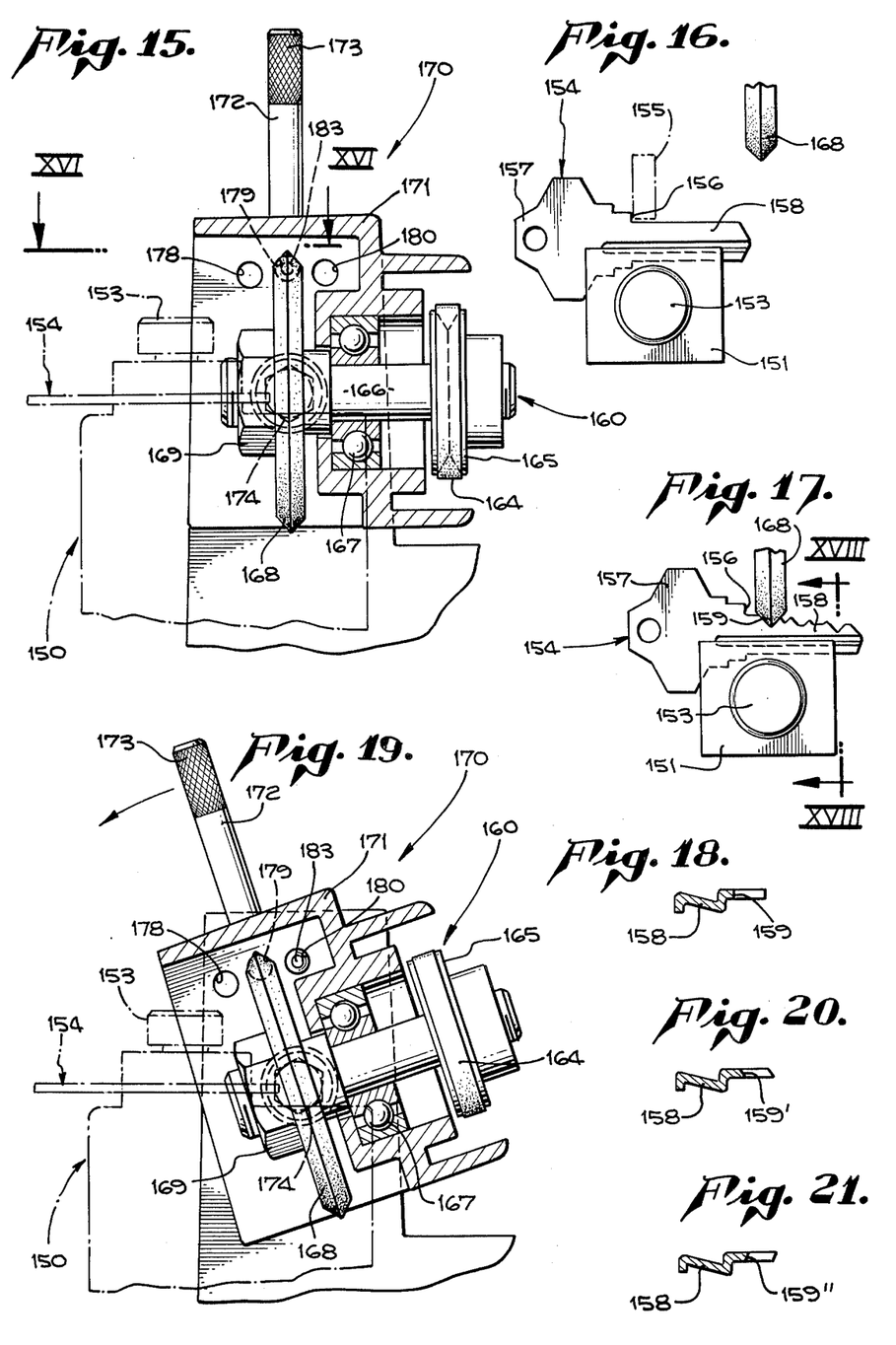
FIG. 15 is a view taken along lines XV—XV of FIG. 11.
FIG. 16 is a view taken along lines XVI—XVI of FIG. 15 with parts thereof omitted for convenience of illustration.
FIG. 17 is a view similar to FIG. 16 showing the key being cut.
FIG. 18 is a view taken along lines XVIII—XVIII of FIG. 17 showing a straight angle of cut on the key, parts thereof being omitted for convenience of illustration.
FIG. 19 is a vertical detailed view, partly in section, similar to FIG. 15 showing an alternate position of a portion of the apparatus of FIGS. 9 through 13.
FIG. 20 is a detailed view, similar to FIG. 18 showing a left angle cut on the key of FIG. 17.
FIG. 21 is a detailed view, similar to FIGS. 18 and 20, showing a right angle cut on the key of FIG. 17.

Duplicating means 80, as particularly contemplated in the present invention, further includes blank key positioning and holding means 150 for holding a blank key in a predetermined position for cutting by the notch cutting means 160. In the exemplary embodiment of the invention, blank key positioning and holding means 150 includes a movable clamping plate 151 (see FIGS. 11 and 13) having a threaded bolt 152 extending therethrough, bolt 152 being fixedly mounted in main body portion 101 of indexing means 101. A knob 153 is threaded on the upper end of bolt 152 so that, as knob 153 is threaded on bolt 152, plate 151 is clamped against body portion 101 to thereby clamp a blank key 154 therebetween. Blank key positioning and holding means 150 also includes, in the exemplary embodiment, means for positioning blank key 154 prior to cutting. Thus, means 150 includes a key positioner arm 155 pivotally mounted at one end on bar 112 (see particularly FIG. 10) and movable from a position out of engagement with blank key 154 (solid lines in FIG. 11) to a position engaging arm 155 (dotted lines in FIG. 11). This is also shown in FIG. 16. That is, blank key 154 includes a shoulder 156 between the head 157 and shank 158 thereof. In the "up" or FIG. 16 position (also the dotted line position in FIG. 11), key 154 is moved between plate 151 prior to clamping until arm 155 abuts against shoulder 156. The key 154 is then clamped and arm 155 is pivoted to the solid line position in FIG. 11.

Duplicating means 80 further includes notch cutting means 160 for cutting a notch in blank key 154. In the exemplary embodiment, as shown particularly in FIG. 11, notch cutting means 160 includes a motor 161 having a rotatable shaft 162. A pulley 163 is fixedly secured to shaft 162 and an endless drive belt 164 is mounted on pulley 163. The belt 164 encircles a pulley 165 secured to a shaft 166 rotatable mounted on housing means 80 via bearing means 167 (see FIG. 15). A grinding wheel 168 is fixed for rotation with shaft 168 via pulley 165 via its connection to shaft 166 through nut 169 and oriented to be in cutting position when blank key 154 is moved as discussed hereinabove (see particularly FIGS. 11 and 13).

Figure 11:
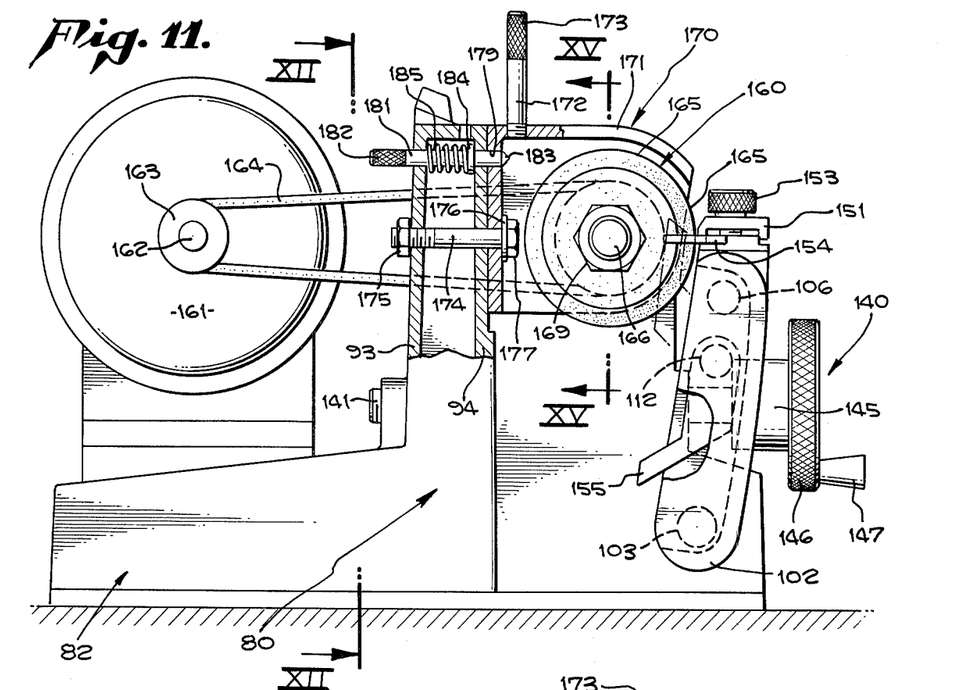
FIG. 11 is a view taken along lines XI—XI of FIG. 10.

As discussed hereinabove, duplicating means 80 may optionally include angle-of-cut indexing means 170 for indexing either a straight, right or left angle of cut onto blank key 154. As shown in FIGS. 18, 20, and 21, these three types of cuts made on the shaft 158 of blank key 154 are illustrated. FIG. 18 shows a straight or center cut 159, FIG. 20 illustrates a cut to the left or a "left" cut 159' and FIG. 21 illustrates a cut to the right or a "right" cut 159". It is to be understood that various key manufacturers use these different angles of cuts which type may have been previously determined as discussed hereinabove with respect to FIGS. 1 through 8. Thus, as particularly contemplated in the present invention, duplicating means 80 may include angle-of-cut indexing means 170 which, in the exemplary embodiment, as particularly shown in FIGS. 15 and 19, includes the housing 171 for grinding wheel 168 being pivotally mounted on upstanding spaced wall portions 93 and 94 on housing means 81. As shown in FIG. 11, a handle 172, terminating in a knurled end 173, is fixedly secured to housing 171. A pivot bolt 174 interconnects housing 171 to wall sections 93 and 94. Bolt 174 extends through and is rotatable in aligned openings in housing 171 and wall sections 93 and 94 are threaded at the end passing through wall section 93 and secured thereto by nut 175. A lock washer 176 may be disposed between bolt head 177 and the inner wall of housing 171.

As shown in FIG. 15, three linearly aligned apertures 178, 179 and 180 extend through housing 171 and, as shown in FIG. 11, apertures 178 through 180 are aligned with like apertures in the spaced wall sections 93, 94 of housing means 81. A lock pin 181 extends through the aligned apertures in wall sections 93, 94 aligned with one of the apertures in housing 171 (aperture 179 in FIG. 11). Pin 181 extends past wall section 93 and terminates in a knurled end 182. The other end is tapered, as at end 183, for ease in insertion into apertures 178 through 180. A sleeve 184 is fixed to pin 181 between the wall sections 93, 94 and a spring 185 encircles pin 181 between wall section 93 and sleeve 184. It can be seen in FIG. 11 that, by grasping pin 181 via end 182, the pin 181 may be pulled against the bias of spring 185 and the end 183 pulled out of the aligned apertures in wall section 94 and housing 171 (the spacing between wall section 93, 94 being greater than the length of the portion of pin 181 within the apertures in wall section 94 and housing 171). Since housing 171 is now free to pivot about pivot bolt 174, the housing 171 may be moved by handle 172 from the FIG. 15 position (relating to a straight or center notch cut as shown in FIG. 18) or to either a right or left cut only one of these positions being illustrated in FIG. 19). Thus, the positions of apertures 178 through 180 are predetermined so that wheel 168 will make either a straight, left or right angle of cut during cutting.

Although various phases of operation for duplicating a key have been heretofore described with respect to the various individual features thereof, a summary of the key duplicating operations is as follows. Housing 171 is pre-set via locking pin 181 prior to cutting depending on the predetermined angle-of-cut to be made. A blank key 154 is positioned as shown in FIG. 11 using positioner arm 155 to position the key and clamping plate 151 to correctly clamp and align the key prior to cutting. Arm 155 is then moved out of positon. The proper notch spacing on drum 105 is selected as heretofore described with respect to FIGS. 1 through 8 and the index card 31 related to the decoded key as discussed with respect to FIGS. 1 through 8 is inserted into slot 90 as shown in FIGS. 13 and 14. As shown in FIG. 22, knob 146 is rotated whereby sleeve member 145 abuts against bar 112 and moves one of the notches 107 into engagment with end portion 126 of pin 124. Continued rotation of know 146 is made until movable sleeve 120 abuts against drum 105 (see FIG. 13). The pointer 127 will now indicate the initial or starting position of the selected line, such as line 32 or sequential index A, on card 31. The motor 161 is started and wheel 168 is rotated. The cutting of a notch in blank key 154 is illustrated in FIG. 17. Knob 146 is rotated and the notch is cut until pointer 127 sweeps across Row A on card 31 in FIG. 14 until the proper predetermined depth-of cut is indicated. This is accomplished by sleeve 120 (FIG. 13) moving within sleeve member 113 and thus moving post 122 and pivoting shaft 128 through the meshing of gear rack 131 on post 122 with the gear 130 of shaft 128. In this manner, the proper angle-of-cut and depth of cut may be made in the shank 158 of blank key 154 as shown in FIG. 17.

It can be seen from the foregoing that I have disclosed a quick and easy apparatus and method for decoding both the depth of notch cut and the angel of notch cut of a key, then, using such information, quickly and easily duplicating such key. With my method and apparatus, any deviations that have entered into the key being duplicated, such as when duplicating a duplicate key where tolerances may have been introduced, may be compensated for and the duplicate key made in accordance with my invention will be more accurate than the key from which the duplicate was made.

I claim:

1. Apparatus for decoding a key having a shank portion with a plurality of spaced transverse notches of differing depths, said key having a predetermined coded depth of said notches, said apparatus comprising:

housing means for receiving coded indicia bearing means therein;

coded indicia bearing means insertable in said housing means having indicia thereon corresponding to a sequential index related to the predetermined coded depth of the notches of said key;

key shank portion recieving means on said housing for receiving the shank portion of said key therein in a predetermined position thereon; and coded notch depth indicating means pivotally mounted on said housing having a first portion conforming to said notches in said shank portion and a second portion movable across said sequential index to thereby indicate the coded depth of one of said notches of said shank portion when said first portion is conformably received in said one of said notches, and angle-of-cut indicating means associated with both said housing and said depth indicating means for indicating the angle of cut of said transverse notch.

2. The apparatus of claim 1 wherein said coded notch depth indicating means includes a spring-biased block member pivotally mounted on said housing, said second portion being a pointer fixedly secured to said block member and extending therefrom to a position adapted to sweep across said sequential index, and a pin member movable within said housing having a main head portion in abutting engagement with said block member and terminating in said first portion.

3. The apparatus of claim 2 wherein said angle-of-cut indicating means includes an indicating member fixedly secured to said main head portion and indicia on said housing, said angle-of-cut indicating member being movable with respect to said last-mentioned indicia between a first position indiciating a straight angle of cut, a second position indicating a right angle of cut and a third position indicating a left angle of cut.

4. A portable hand-held device for decoding a key having a shank portion with a plurality of spaced transverse notches of differing depths, said key having a predetermined coded depth of said notches, said apparatus comprising:

hand-held housing means having a card-receiving slot therein for receiving coded indicia bearing card means in said slot and a viewing window in said housing means aligned with said slot, said coded indicia being viewable through said viewing window;

coded indicia bearing card means insertable in said slot having coded indicia thereon viewable through said viewing window corresponding to a sequential index related to the predetermined coded depth of the notches of said key;

key shank portion receiving means on said housing for receiving the shank portion of said key therein in a predetermined position thereon; and coded notch depth indicating means pivotally mounted wholly within said housing and having a first portion conforming to said notches in said shank portion and a second pointer portion coupled to said first portion and movable across said indicia on said card means and viewable through said viewing window to thereby indicate the coded depth of one of said notches of shank portion when said first portion is conformably received in said one of said notches, said depth indicating means including angle of cut indicating means for indicating the angle of cut of said notches.

5. The device of claim 4 wherein said coded notch depth indicating means includes a spring-biased block member pivotally mounted on said housing, said second pointer portion being a pointer fixedly secured to said block member and extending therefrom to a position adapted to sweep across said indicia on said card means and a pin member linearly movable within said housing having a main head portion bearing against the underside of said block member and terminating in said first portion, said main head portion being adapted to pivot said block member against the bias of said spring when said first portion is conformably received in one of said notches.

* * * * *